US008013460B2

(12) United States Patent
Kinzie et al.

(10) Patent No.: US 8,013,460 B2
(45) Date of Patent: Sep. 6, 2011

(54) METHOD AND APPARATUS FOR CONTROLLING NOISE LEVELS OF A TURBINE WITH MINIMAL LOSS IN ENERGY YIELD

(75) Inventors: Kevin Kinzie, Moore, SC (US); Stefan Herr, Greenville, SC (US); Benoit Petitjean, Greer, SC (US)

(73) Assignee: General Electric Company, Schenectady ny ( * ) Notice: Subject to any disclaimer, the term of this patent is extended or adjusted under 35 U.S.C. 154(b) by 0 days.

(21) Appl. No.: 12/818,315

(22) Filed: Jun. 18, 2010

(65) Prior Publication Data
US 2011/0006527 A1 Jan. 13, 2011

Related U.S. Application Data

(63) Continuation of application No. 12/498,700, filed on Jul. 7, 2009, now Pat. No. 7,763,989.

(51) Int. Cl.
*F03D 9/00* (2006.01)
(52) U.S. Cl. .......................................... 290/44; 290/55
(58) Field of Classification Search .................. 290/43, 290/44, 54, 55; 322/37, 29
See application file for complete search history.

(56) References Cited

U.S. PATENT DOCUMENTS

| 4,695,736 | A | * | 9/1987 | Doman et al. | 290/44 |
|---|---|---|---|---|---|
| 4,700,081 | A | * | 10/1987 | Kos et al. | 290/44 |
| 4,703,189 | A | * | 10/1987 | DiValentin et al. | 290/44 |
| 6,688,841 | B1 | | 2/2004 | Wobben | |
| 6,856,039 | B2 | * | 2/2005 | Mikhail et al. | 290/44 |
| 6,966,754 | B2 | | 11/2005 | Wobben | |
| 7,118,338 | B2 | | 10/2006 | Moroz et al. | |
| 7,275,912 | B2 | | 10/2007 | Steudel | |
| 7,352,075 | B2 | * | 4/2008 | Willey et al. | 290/44 |
| 7,417,332 | B2 | * | 8/2008 | Malakhova et al. | 290/44 |
| 7,420,289 | B2 | | 9/2008 | Wang et al. | |
| 7,437,264 | B2 | * | 10/2008 | Pierce et al. | 702/151 |
| 7,750,490 | B2 | * | 7/2010 | Scholte-Wassink | 290/44 |
| 7,763,989 | B2 | * | 7/2010 | Kinzie et al. | 290/44 |
| 2007/0031237 | A1 | | 2/2007 | Bonnet | |
| 2007/0085343 | A1 | | 4/2007 | Fortmann | |
| 2008/0086281 | A1 | | 4/2008 | Santos | |
| 2008/0136188 | A1 | | 6/2008 | Krueger | |

FOREIGN PATENT DOCUMENTS

EP 2000665 A2 10/2008

* cited by examiner

*Primary Examiner* — Nicholas Ponomarenko
(74) *Attorney, Agent, or Firm* — McNees Wallace & Nurick LLC

(57) ABSTRACT

A method for controlling a tip speed of a blade of a wind turbine. The method includes determining the wind speed proximate the wind turbine; maintaining a first substantially constant rotational speed of the tip of the blade during variable wind speeds above a first predetermined nominal wind speed and below the second predetermined nominal wind speed; maintaining a second substantially constant rotational speed of the tip of the blade during variable wind speeds above a second predetermined nominal wind speed. The noise generated by wind at the second predetermined nominal wind speed is greater than noise generated by the blade at the second constant rotational speed of the tip of the blade.

6 Claims, 8 Drawing Sheets

METHOD AND APPARATUS FOR CONTROLLING NOISE LEVELS OF A TURBINE WITH MINIMAL LOSS IN ENERGY YIELD

FIELD

The present disclosure is directed to a system for controlling the operation of a wind turbine, and specifically to a system which meets specific noise levels with minimal loss in energy yield.

BACKGROUND

Wind energy systems have gained more and more importance as a source of energy in recent years. As areas suitable for their economical operation are relatively scarce in a number of countries, a growing number of wind energy systems are located close to populated areas. As the running of wind turbines in wind energy systems causes noise, this leads to various problems, such as resistance from neighborhoods and the like. A variety of factors contribute to the overall noise emission of such systems, such as tonal noise emissions and aerodynamic noise emissions.

Methods for reducing the noise emissions of wind energy systems have long been discussed. For example, it has been proposed to reduce aerodynamic noise caused by the blades through a speed/torque control of the system in order to keep turbine speed low during certain time intervals, e.g. during night time. Others have proposed to reduce speed/torque of the wind turbines in a wind park individually in order to gain maximum overall performance of the system while avoiding having a part of the wind turbines running at significantly higher speeds than the average speed of all turbines.

It is well established that to limit the noise generated by a wind turbine blade, the maximum tip speed with which it rotates must be limited. The limitation of the tip speed requires a reduction in the rated power to limit the torque generated in the drive train of the turbine. This reduces the annual energy yield of the turbine. However, for higher wind speeds it is not necessary to limit the maximum tip speed of the blade, as the background noise of the wind (e.g., the ambient or background sounds of the wind itself in the areas surrounding the wind turbine) will cover even a larger noise generation of the wind turbine. Therefore, it would be beneficial to provide a system in which the turbine can be re-accelerated and the original rated power achieved when environmental conditions allow, thereby providing a system that meets a specific maximum noise level with minimal loss in annual energy yield.

SUMMARY

One aspect of the disclosure is directed to a method for controlling the tip speed of a blade of a wind turbine which has the blade attached to a hub having a shaft, and an electrical generator. The method includes, but is not limited to, monitoring a wind speed proximate the wind turbine; maintaining a first substantially constant rotational speed of the tip of the blade during variable wind speeds above the first predetermined nominal wind speed and below the second predetermined nominal wind speed which is greater than the first predetermined nominal wind speed; maintaining a second substantially constant rotational speed of the tip of the blade during variable wind speeds above the second predetermined nominal wind speed. The second constant rotational speed of the tip of the blade is greater than the first constant rotational speed of the tip of the blade. The noise generated by wind at the second predetermined nominal wind speed is greater than noise generated by the blade at the second constant rotational speed of the tip of the blade.

Another aspect of the disclosure is also directed to a method for controlling a tip speed of a blade of a wind turbine. The method includes, but is not limited to, determining a wind speed proximate the wind turbine; maintaining a first substantially constant rotational speed of the tip of the blade during variable wind speeds above the first programmed nominal wind speed and below the second programmed nominal wind speed, with the first programmed nominal wind speed being less than the second programmed nominal wind speed; maintaining a second substantially constant rotational speed of the tip of the blade during variable wind speeds above the second predetermined nominal wind speed. The second constant rotational speed of the tip of the blade is greater than the first constant rotational speed of the tip of the blade. Noise generated by the wind at the second programmed nominal wind speed is greater than noise generated by the blade at the second constant rotational speed of the tip of the blade.

The disclosure is also directed to a wind turbine having a rotor with a hub, at least one rotor blade coupled to the hub, and a rotor shaft coupled to the hub for rotation therewith. An electrical generator is coupled to the rotor shaft and is configured to couple to an electrical load. Sensors for sensing conditions of the wind turbine are provided proximate the wind turbine. A control system is coupled to the sensors and is configured to control a speed of a tip of the rotor blade by determining a wind speed proximate the wind turbine; comparing the determined wind speed to a first programmed nominal wind speed and a second programmed nominal wind speed. Wherein the control system maintains a first substantially constant rotational speed of the tip of the blade during variable wind speeds above the first programmed nominal wind speed and below the second programmed nominal wind speed. The first programmed nominal wind speed is less than the second programmed nominal wind speed. Wherein the control system maintains a second substantially constant rotational speed of the tip of the blade during variable wind speeds above the second predetermined nominal wind speed. The second constant rotational speed of the tip of the blade is greater than the first constant rotational speed of the tip of the blade.

The system described herein has many advantages, including, but not limited to, the ability to meet specific maximum noise levels with minimal loss in annual energy yield. The system monitors the wind speed or other parameters and adjusts the maximum tip speed of the wind turbine blade accordingly. For lower wind speeds, the maximum tip speed is limited to minimize the amount of noise generated by the rotation of the blades. However, for higher wind speeds there is no need to limit the maximum tip speed of the blade, as the background noise of the wind (i.e., the ambient or background sounds of the wind itself in the areas surrounding the wind turbine) will cover even a larger noise generation of the wind turbine. In addition, the movement of the blade pitch towards feather during increased wind speeds limits the wind turbine noise generation. Hence, as the tip speed limit is not required for all wind speeds, the turbine can be re-accelerated and the original rated power achieved without causing the noise level of the wind turbine to increase beyond the background noise generated by the wind.

Other features and advantages of the present disclosure will be apparent from the following more detailed description of the preferred embodiment, taken in conjunction with the

DETAILED DESCRIPTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically, mechanical energy converted from kinetic energy of wind, for a predetermined purpose other than generating electrical power, such as, but not limited to, pumping a fluid and/or grinding a substance.

Figure 1:
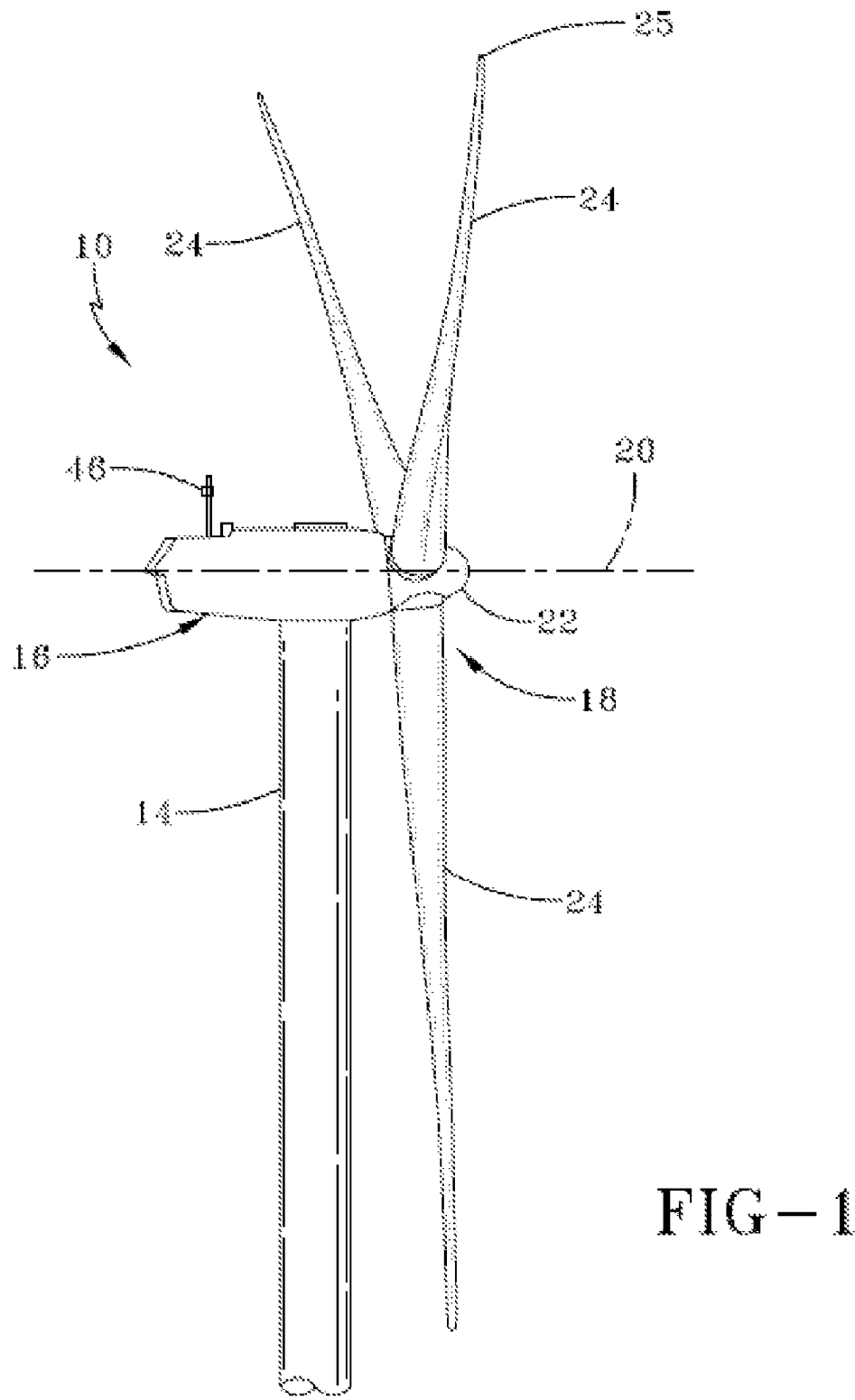
FIG. 1 is a perspective view of an exemplary wind turbine in accordance with an embodiment of the present disclosure.
Figure 2:
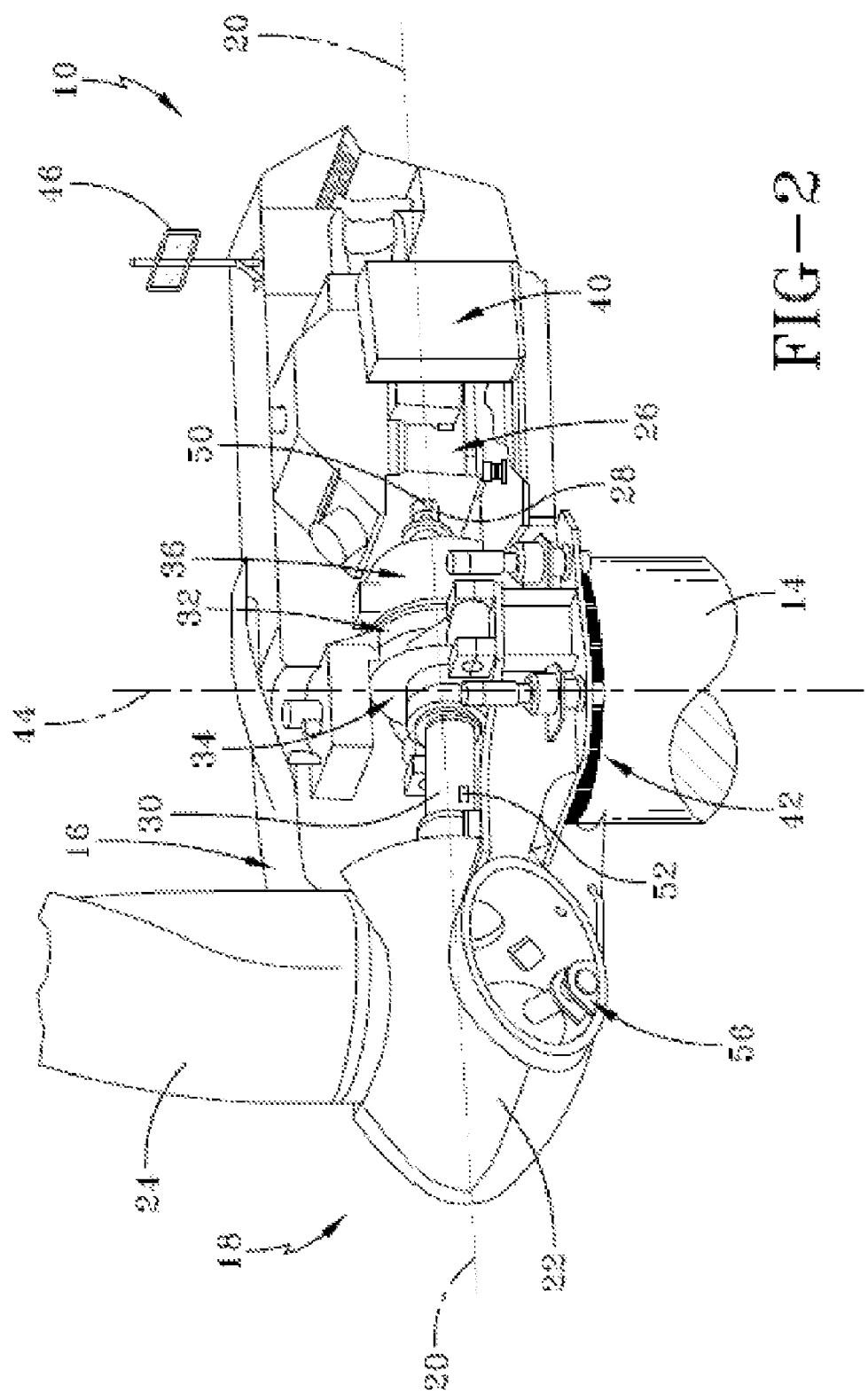
FIG. 2 is a partially cut-away perspective view of a portion of the wind turbine shown in FIG. 1 in accordance with an embodiment of the present disclosure.
Figure 3:
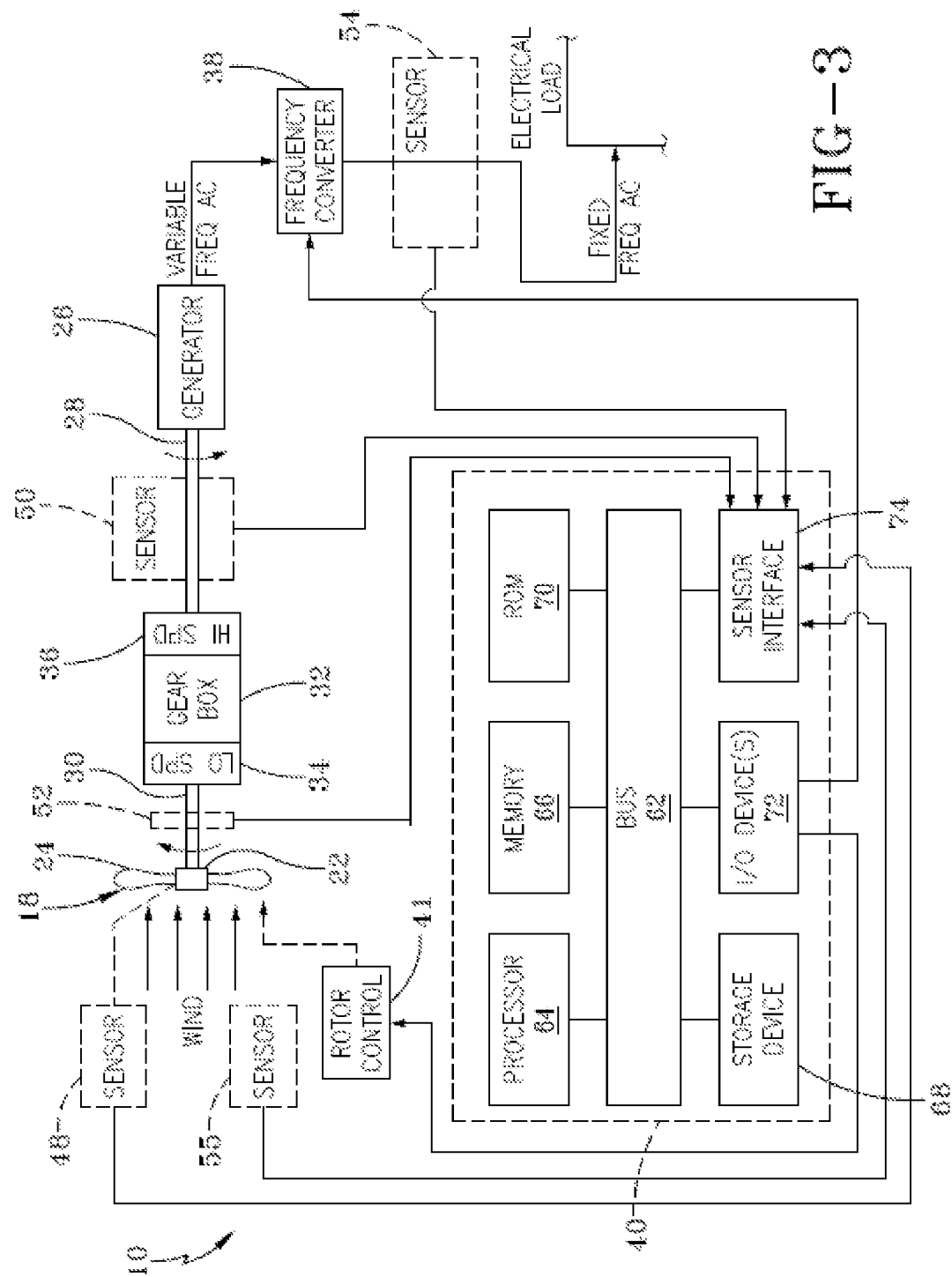
FIG. 3 is a schematic diagram of the wind turbine shown in FIGS. 1 and 2.

FIG. 1 is a perspective view of an exemplary wind turbine 10 in accordance with an embodiment of the present disclosure. FIG. 2 is a partially cut-away perspective view of a portion of wind turbine 10 in accordance with an embodiment of the present disclosure. FIG. 3 is a schematic diagram of wind turbine 10. Wind turbine 10 described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid (not shown) for receiving electrical power therefrom to drive operation of wind turbine 10 and/or its associated components and/or for supplying electrical power generated by wind turbine 10 thereto. Although only one wind turbine 10 is shown in FIGS. 1-3, in some embodiments a plurality of wind turbines 10 may be grouped together, sometimes referred to as a "wind farm".

Wind turbine 10 includes a body 16, sometimes referred to as a "nacelle", and a rotor (generally designated by 18) coupled to body 16 for rotation with respect to body 16 about an axis of rotation 20. In the exemplary embodiment, nacelle 16 is mounted on a tower 14. The height of tower 14 may be any suitable height enabling wind turbine 10 to function as described herein. Rotor 18 includes a hub 22 and a plurality of blades 24 (sometimes referred to as "airfoils") extending radially outward from hub 22 for converting wind energy into rotational energy. Each blade 24 has a tip 25 positioned at the end thereof which is distant from the hub 22. Although rotor 18 is described and illustrated herein as having three blades 24, rotor 18 may have any number of blades 24. Blades 24 may each have any length (whether or not described herein).

Despite how rotor blades 24 are illustrated in FIG. 1, rotor 18 may have blades 24 of any shape, and may have blades 24 of any type and/or any configuration, whether or not such shape, type, and/or configuration is described and/or illustrated herein. Another example of another type, shape, and/or configuration of rotor blades 24 is a darrieus wind turbine, sometimes referred to as an "eggbeater" turbine. Yet another example of another type, shape, and/or configuration of rotor blades 24 is a savonious wind turbine. Even another example of another type, shape, and/or configuration of rotor blades 24 is a traditional windmill for pumping water, such as, but not limited to, four-bladed rotors having wooden shutters and/or fabric sails. Moreover, wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Referring now to FIGS. 2 and 3, wind turbine 10 includes an electrical generator 26 coupled to rotor 18 for generating electrical power from the rotational energy generated by rotor 18. Generator 26 may be any suitable type of electrical generator, such as, but not limited to, a wound rotor induction generator. Generator 26 includes a stator (not shown) and a rotor (not shown). Rotor 18 includes a rotor shaft 30 coupled to rotor hub 22 for rotation therewith. Generator 26 is coupled to rotor shaft 30 such that rotation of rotor shaft 30 drives rotation of the generator rotor, and therefore operation of generator 26. In the exemplary embodiment, the generator rotor has a rotor shaft 28 coupled thereto and coupled to rotor shaft 30 such that rotation of rotor shaft 30 drives rotation of the generator rotor. In other embodiments, the generator rotor is directly coupled to rotor shaft 30, sometimes referred to as a "direct-drive wind turbine". In the exemplary embodiment, generator rotor shaft 28 is coupled to rotor shaft 28 through a gearbox 32, although in other embodiments generator rotor shaft 28 is coupled directly to rotor shaft 30. More specifically, in the exemplary embodiment, gearbox 32 has a low speed side 34 coupled to rotor shaft 30 and a high speed side 36 coupled to generator rotor shaft 28. The torque of rotor 18 drives the generator rotor to thereby generate variable frequency AC electrical power from rotation of rotor 18. Generator 26 has an air gap torque between the generator rotor and stator that opposes the torque of rotor 18. A frequency converter 38 is coupled to generator 26 for converting the variable frequency AC to a fixed frequency AC for delivery to an electrical load (not shown), such as, but not limited to, a power grid (not shown), coupled to generator 26. Frequency converter 38 may be located anywhere within or remote to wind turbine 10. For example, in the exemplary embodiment, frequency converter 38 is located within a base (not shown) of tower 14.

Wind turbine 10 includes one or more control systems 40 coupled to some or all of the components of wind turbine 10 for generally controlling operation of wind turbine 10 and/or some or all of the components thereof (whether or not such components are described and/or illustrated herein), and in particular for controlling the tip speed of the blades 24 to control the noise generated by the blades 24. For example, in the exemplary embodiment, control system(s) 40 are coupled to a rotor control 41 for generally controlling rotor 18. In the exemplary embodiment, control system(s) 40 is mounted within nacelle 16. However, additionally or alternatively, one or more control systems 40 may be remote from nacelle 16 and/or other components of wind turbine 10. Control system(s) 40 may be used for, but is not limited to, noise level versus power generation monitoring and control including, for example, pitch and speed regulation, high-speed shaft and yaw brake application, yaw and pump motor application, and/or fault monitoring. Alternative distributed or centralized control architectures may be used in some embodiments.

In some embodiments, wind turbine 10 may include a disc brake (not shown) for braking rotation of rotor 18 to, for example, slow rotation of rotor 18, brake rotor 18 against full wind torque, and/or reduce the generation of electrical power from electrical generator 26. Furthermore, in some embodiments, wind turbine 10 may include a yaw system 42 for rotating nacelle 16 about an axis of rotation 44 for changing a yaw of rotor 18, and more specifically for changing a direction faced by rotor 18 to, for example, adjust an angle between the direction faced by rotor 18 and a direction of wind. Yaw system 42 may be coupled to control system(s) 40 for control thereby. In some embodiments, wind turbine 10 may include anemometry 46 for measuring wind speed and/or wind direction. Anemometry 46, in some embodiments, may be coupled to control system(s) 40 for sending measurements to control system(s) 40 for processing thereof. For example, although anemometry 46 may be coupled to control system(s) 40 for sending measurements thereto for controlling other operations of wind turbine 10, anemometry 46 may send measurements to control system(s) 40 for controlling and/or changing a yaw of rotor 18 using yaw system 42. Alternatively, anemometry 46 may be coupled directly to yaw system 42 for controlling and/or changing a yaw of rotor 18.

Wind turbine 10 may also include a plurality of sensors 48 (FIG. 3), each coupled to a corresponding blade 24 for measuring a pitch of each blade 24, or more specifically an angle of each blade 24 with respect to a wind direction and/or with respect to rotor hub 22. Sensors 48 may be any suitable sensor having any suitable location within or remote to wind turbine 10, such as, but not limited to, optical encoders within pitch system 56 (described below). In some embodiments, sensors 48 are coupled to control system(s) 40 for sending pitch measurements to control system(s) 40 for processing thereof.

Wind turbines 10 may also include one or more sensors 50 coupled to generator rotor shaft 28 for measuring a speed of rotation of rotor shaft 28 and/or a torque of generator rotor shaft 28. Sensor(s) 50 may be any suitable sensor having any suitable location within or remote to wind turbine 10, such as, but not limited to, optical encoders, digital proximity sensors, strain gages, and/or tachometers. In some embodiments, sensor(s) 50 are coupled to control system(s) 40 for sending speed measurements to control system(s) 40 for processing thereof.

Wind turbines 10 may also include one or more sensors 52 coupled to rotor shaft 30 for measuring a speed of rotation of generator shaft 28 and/or a torque of rotor shaft 30. Sensor(s) 52 may be any suitable sensor having any suitable location within or remote to wind turbine 10, such as, but not limited to, optical encoders, digital proximity sensors, piezo-electric transducers, strain gages, and/or tachometers. In some embodiments, sensor(s) 52 are coupled to control system(s) 40 for sending measurements to control system(s) 40 for processing thereof.

Wind turbines 10 may also include one or more sensors 54 (FIG. 3) coupled to generator 26 for measuring an electrical power output of generator 26. In some embodiments, sensor(s) 54 are coupled to control system(s) 40 for sending measurements to control system(s) 40 for processing thereof. Sensor(s) 54 may be any suitable sensor having any suitable location within or remote to wind turbine 10, such as, but not limited to, Hall effect current transducers (CTs) and/or capacitive voltage transducers (CVTs).

Wind turbines 10 may also include one or more sensors 55 (FIG. 3) coupled to control system(s) 40 for sending measurements to control system(s) 40 for processing thereof. Sensors 55 may be any suitable sensor having any suitable location within or remote to wind turbine 10, such as, but not limited to, anemometers.

Wind turbine 10 may also include one or more other sensors (not shown) coupled to one or more components of wind turbine 10 and/or the electrical load, whether or not such component(s) are described or illustrated herein, for measuring parameters of such component(s). Such other sensor(s) may include, but are not limited to, sensors configured to measure displacements, yaw, pitch, moments, strain, stress, twist, damage, failure, rotor torque, rotor speed, an anomaly in the electrical load, and/or an anomaly of power supplied to any component of wind turbine 10. Such other sensors may couple to any component of wind turbine 10 and/or the electrical load at any location thereof for measuring any parameter thereof, whether or not such component, location, and/or parameter is described and/or illustrated herein.

Wind turbine 10 includes a variable blade pitch system 56 for controlling, including but not limited to changing, a pitch angle of rotor blades 24 (shown in FIGS. 1-3) in response to a condition such as wind speed.

Referring again to FIG. 3, in some embodiments, control system(s) 40 include a bus 62 or other communications device to communicate information. One or more processor(s) 64 are coupled to bus 62 to process information, including information from anemometry 46, sensors 48, 50, 52, 54 and/or 55, and/or other sensor(s). Control system(s) 40 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or also storage device(s) 68, if included) can also be used to store temporary variables or other intermediate information during execution of instructions by processor(s) 64. Control system(s) 40 may also include one or more read only memories (ROM) 70 and/or other static storage devices coupled to bus 62 to store and provide static (i.e., non-changing) information and instructions to processor(s) 64. Input/output device(s) 72 may include any device known in the art to provide input data to control system(s) 40 and/or to provide outputs, such as, but not limited to, yaw control and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless, providing access to one or more electronically-accessible media, etc. In some embodiments, hardwired circuitry can be used in place of or in combination with software instructions. Thus, execution of sequences of instructions is not limited to any specific combination of hardware circuitry and software instructions, whether described and/or illustrated herein. Control system(s) 40 may also include a sensor interface 74 that allows control system(s) 40 to communicate with anemometry 46, sensors 48, 50, 52, 54 and/or 55, and/or other sensor(s). Sensor interface 74 can be or can include, for example, one or more analog-to-digital converters that convert analog signals into digital signals that can be used by processor(s) 64.

Figure 4:
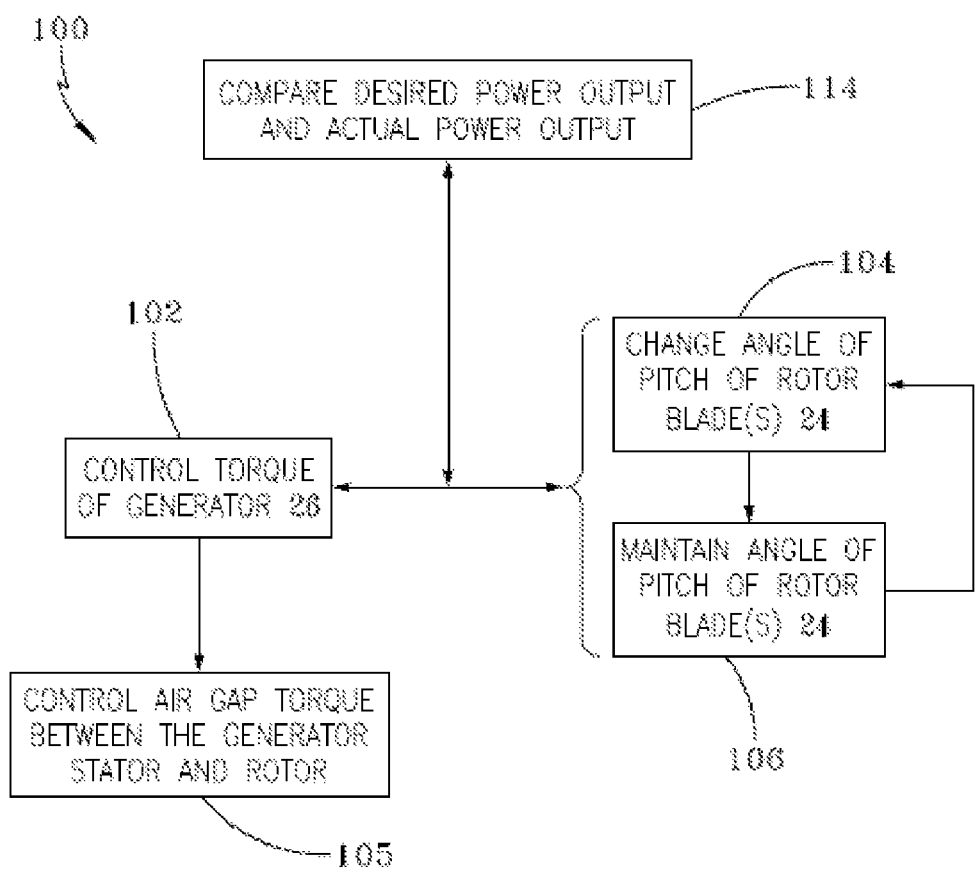
FIG. 4 is a flowchart illustrating an exemplary embodiment of a method for controlling a rotor speed of the wind turbine shown in FIGS. 1-3.

FIG. 4 is a flowchart illustrating an exemplary embodiment of a method 100 for controlling a speed of rotor 18 and the speed of the blade tips 25. Control of the speed of the blade tips 25 is important in applications in which the noise generated by the wind turbine 10 must be controlled to meet established noise level requirements. In general, the noise generated by the wind turbine 10 is increased as the blade tips 25 rotate faster. In particular applications, noise constraints have been imposed, thereby limiting the noise which is permitted to be generated by the wind turbine 10 and thereby limiting the speed with which the blade tips 25 can rotate.

Method 100 includes controlling a torque of generator 26 (shown in FIGS. 2 and 3) to thereby control a torque of rotor shaft 30 (shown in FIG. 2), and alternating between changing 104 an angle of pitch of one or more rotor blades 24 (shown in FIGS. 1 and 2) to facilitate controlling the speed of rotor 18 and maintaining 106 the angle of pitch of one or more rotor blades 24 substantially constant. Controlling the generator torque, step 102, may include, but is not limited to, selecting generator torque, changing the generator torque, and/or controlling a rate at which the generator torque is changed. The value(s) of generator torque selected, changed, and/or controlled may be any suitable value(s) or range thereof, such as, but not limited to +/−20% of a predetermined rated torque. Control of generator torque may be performed during any portion of alternating between adjusting pitch angle, step 104, and maintaining pitch angle, step 106. For example, generator torque may be controlled during a change of blade pitch angle and/or while pitch angle is maintained. In some embodiments, and for example, if controlling generator torque, step 102, is sufficient to regulate a desired rotational speed of rotor 18, for example, a speed that generates a desired power output of generator 26, blade pitch angle may not be changed. In some embodiments generator torque is controlled simultaneously with adjusting pitch angle, step 104, for example, to facilitate preventing operation of wind turbine 10 at speeds and/or torques above or below predetermined limits.

Changing the pitch angle, step 104, of blades 24 may include controlling a rate at which the pitch angle of one or more blades 24 is changed. The value(s) of blade pitch angle changed (i.e., step 104) and/or maintained (i.e., step 106) may be any suitable value(s) or range thereof, such as, but not limited to, between about −5 degrees and about +30 degrees. In some embodiments, changing of blade pitch may include a dead band to accommodate, for example, gear backlash or other operational condition. In some embodiments, the dead band is different depending upon a direction of change of pitch angle.

Controlling a torque of generator rotor shaft 28 and alternating between adjusting an angle of pitch (i.e., step 104) of one or more rotor blades 24 and maintaining (i.e., step 106) the angle of pitch of one or more rotor blades 24 substantially constant may be performed using any suitable structure, process, and/or means. In the exemplary embodiment, method 100 controls generator torque and alternates between changing an angle of pitch of one or more rotor blades 24 and maintaining the angle of pitch of one or more rotor blades 24 substantially constant using control system(s) 40 (shown in FIGS. 2 and 3) and input from anemometry 46 (shown in FIGS. 1 and 2), sensors 48, 50, 52, 54 and/or 55 (shown in FIG. 3), and/or other sensor(s). Generator torque may be controlled in step 102 using any suitable structure, process, and/or means. In the exemplary embodiment, frequency converter 38 (shown in FIGS. 2 and 3) controls the torque of generator 26 by controlling 105 the air gap torque between the rotor and stator of generator 26 (shown in FIGS. 2 and 3). Moreover, in the exemplary embodiment, frequency converter 38 controls the torque of generator rotor shaft 28 (shown in FIGS. 2 and 3) to thereby control the torque of rotor shaft 30. However, in other embodiments, for example wherein wind turbine 10 is a direct-drive wind turbine, frequency converter 38 may control the torque of a coupling between the generator rotor and rotor shaft 30 to thereby control the torque of rotor shaft 30. Blade pitch may be controlled using suitable structure, process, and/or means. In the exemplary embodiment, blade pitch is controlled 102 using variable blade pitch system 56.

Although method 100 may include controlling generator torque, step 102, and alternating between adjusting blade pitch, step 104, and maintaining blade pitch, step 106, during variable speed operation of wind turbine 10 at or below a predetermined nominal wind speed (which may be based on a desired power output of generator 26), in the exemplary embodiment method 100 controls generator torque and alternates between adjusting and maintaining blade pitch to facilitate generally first constant speed operation of wind turbine 10 (maintaining a substantially first constant speed of rotor 18) at or above a first predetermined nominal wind speed and a generally second constant speed of operation of wind turbine 10 (maintaining a substantially second constant speed of rotor 18) at or above a second predetermined nominal wind speed. In some embodiments, the wind speed is variable above the predetermined nominal wind speed such that method 100 controls generator torque and alternates between changing and maintaining blade pitch to facilitate generally constant speed operation of wind turbine 10 during variable wind speeds over the predetermined nominal wind speed.

Figure 5:
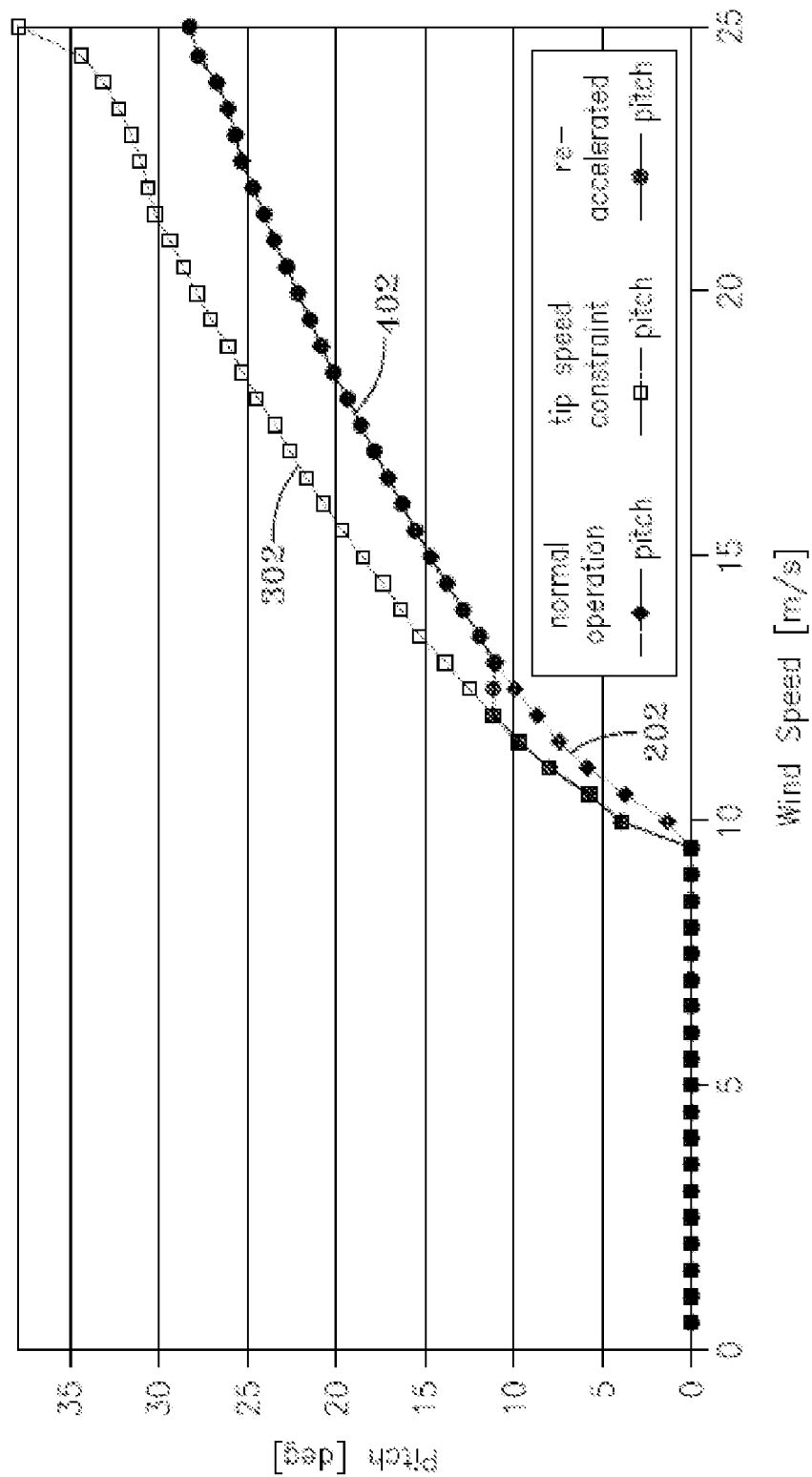
FIG. 5 is a graph illustrating the pitch of the blades of the wind turbine in relation to the wind speed.
Figure 6:
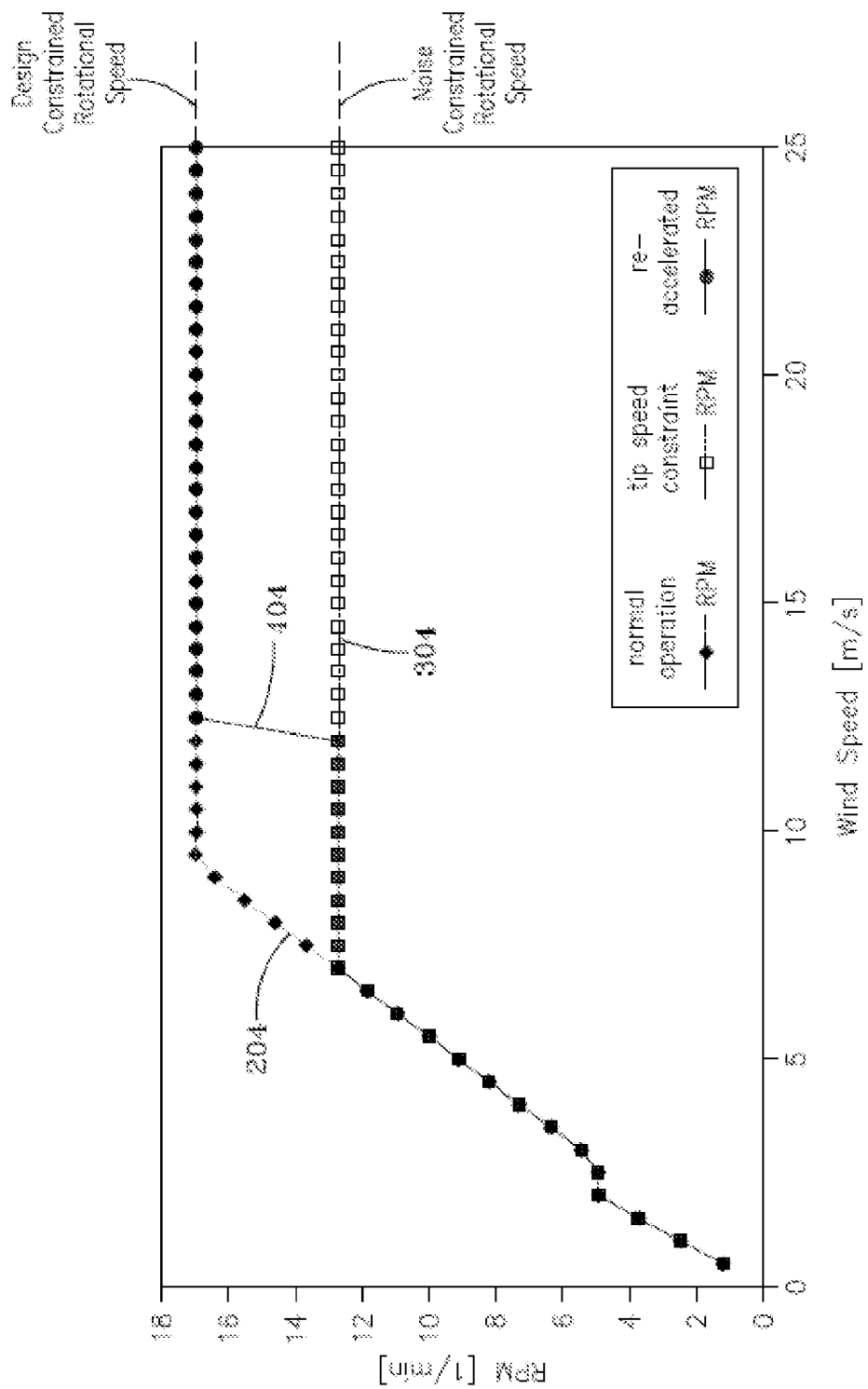
FIG. 6 is a graph illustrating the rpm of the wind turbine in relation to the wind speed.
Figure 7:
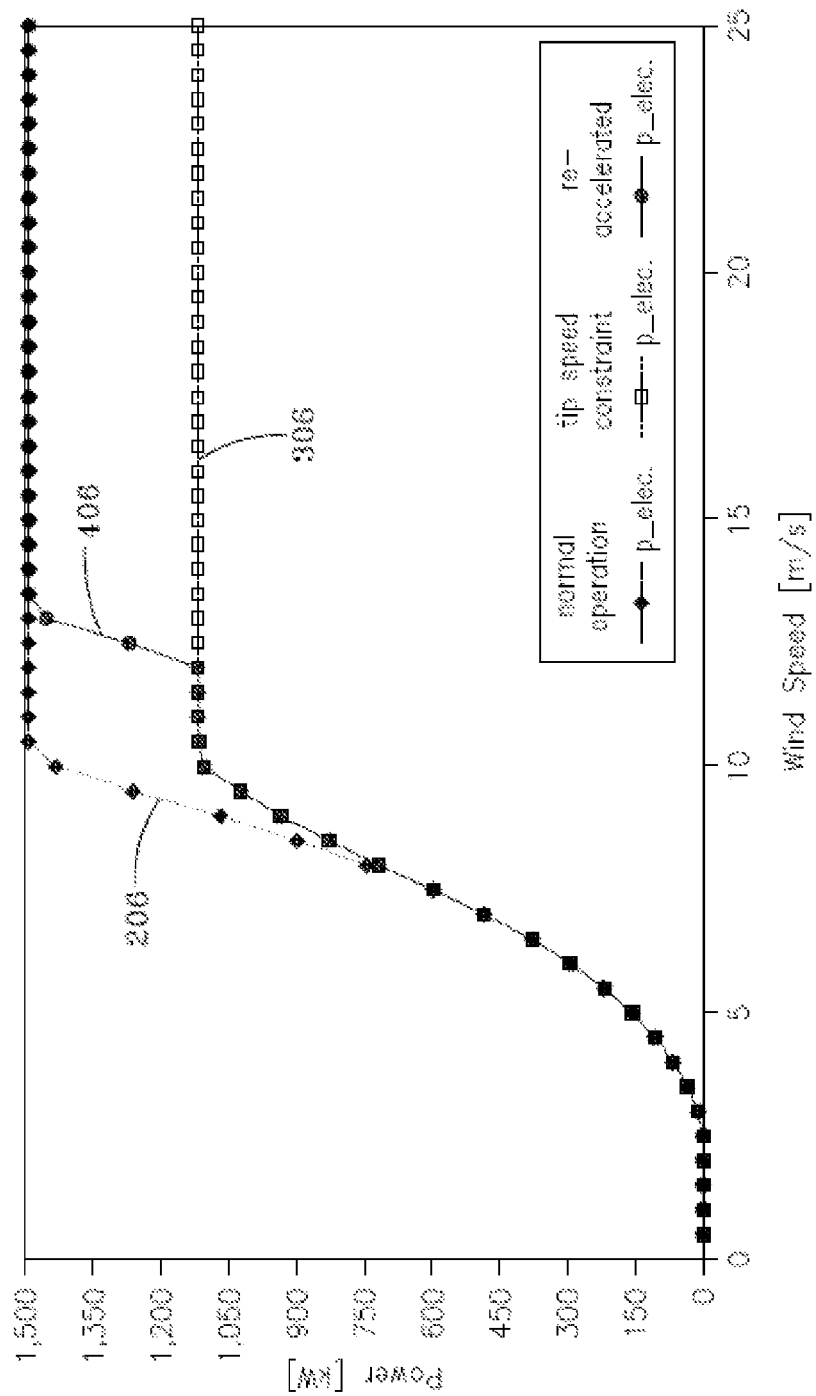
FIG. 7 is a graph illustrating the power generated by the wind turbine in relation to the wind speed.

Referring to FIGS. 5 through 7, the operation of the wind turbine 10 will be described with reference to the graphs. In normal operation, i.e., operation in which noise restrictions are not present, the pitch of the blades 24 is maintained at zero degrees until wind speeds reach a characteristic wind speed, which is shown as about 9 meters per second (m/s), as shown by curve 202 in FIG. 5. With wind speeds between approximately 9 m/s and 25 m/s, the pitch varies between zero and approximately 28 degrees. This adjustment of the pitch of the blade 24 causes the rotation of the blade tips 25, blades 24 and rotor 18 to follow curve 204 of FIG. 6. As is shown, the rotation per minute (rpm) of the rotor 18 is at zero when the wind speed is zero and increases to the design-constrained rotational speed when the wind speed is approximately 9 m/s or higher. The rotation is not permitted to go above the design-constrained rotational speed, shown as 17 rpm in FIG. 6, as higher rpm can cause damage and unsafe conditions with respect to the wind turbine 10. The control system 40 uses input from wind sensor 55 and compares the input to the predetermined or programmed nominal wind speeds to determine the maximum rpm for the given wind speed. In the alternative, the control system 40 may calculate or determine the wind speed by using input from other sensors and comparing the input to stored information to calculate the wind speed. The rpm of the rotor 18 is controlled by using any method described herein or any other known method of controlling the rotation of the rotor 18, including the method of changing the pitch of certain blades and maintaining the pitch of other blades. As shown in FIG. 7, the rotation of the rotor 18 which is coupled to the electrical generator 26 causes power to be generated in accordance with curve 206. The range of power generated by each wind turbine 10 varies between zero and a maximum "rated power," which may be, for example, 1500 kilowatts (kW) or more and depends on the rotation of the rotor 18, which likewise depends on wind speed. As is shown in FIGS. 6 and 7, the maximum power generation is reached at approximately the same time as the maximum rpm is reached. The power generated is related to the rpm; the maximum power is capped at wind speeds greater than 9 m/s. Accordingly, wind speed, blade pitch, rotor speed, and power output are exemplary values only. Wind speed, blade pitch, rotor speed, and power output may have any other suitable value(s) depending upon, for example, a location of wind turbine 10, design parameters of wind turbine 10 overall and/or any component thereof, and/or other characteristics of wind turbine 10.

In normal operation where tip speed is not constrained, the rpm and the power generation are limited by the physical limitations of the wind turbine 10. There is no consideration given to the noise generated or the implications of such noise to the surroundings.

In reduced noise or tip speed constraint operation, i.e., operation in which noise restrictions are required and maintained for wind speeds over approximately 9 m/s, the pitch of the blades 24 is maintained at zero degrees until wind speeds reach a characteristic wind speed, which is shown as about 9 meters per second (m/s), as shown by curve 302 in FIG. 5. With wind speeds between approximately 9 m/s and 25 m/s, the pitch varies between zero and approximately 37 degrees. This adjustment of the pitch of the blade 24 causes the rotation of the blade tips 25, blades 24 and rotor 18 to follow curve 304 of FIG. 6. As is shown, the rotation per minute (rpm) of the rotor 18 is at zero when the wind speed is zero and increases in a non-constrained manner to a noise-constrained rotational speed shown as 13 rpm in FIG. 6 when the wind speed is approximately 7 m/s or higher. The rpm is not permitted to go above the noise-constrained rotational speed, as higher rpm would cause the noise from the blades 24 to exceed the maximum noise level allowed from the wind turbine 10. The control system 40 uses input from wind sensor 55 and compares the input to the predetermined or programmed nominal wind speeds to determine the maximum rpm for the given wind speed. In the alternative, the control system 40 may calculate or determine the wind speed by using input from other sensors and comparing the input to stored information to calculate the wind speed. The rpm of the rotor 18 is controlled by using any method described herein or any other known method of controlling the rotation of the rotor 18, including the method of changing the pitch of certain blades and maintaining the pitch of other blades. As shown in FIG. 7, the rotation of the rotor 18 which is coupled to the electrical generator 26 causes power to be generated in accordance with curve 306. The range of power generated by each wind turbine 10 varies between zero and 1100 kilowatts (kW) depending on the rotation of the rotor 18, which depends on wind speed. As is shown in FIGS. 6 and 7, the maximum power generation is reached shortly after the maximum rpm is reached. The power generated is related to the rpm; the maximum power is capped at wind speeds greater than 7 m/s. Accordingly, wind speed, blade pitch, rotor speed, and power output are exemplary values only. Wind speed, blade pitch, rotor speed, and power output may have any other suitable value(s) depending upon, for example, a location of wind turbine 10, design parameters of wind turbine 10 overall and/or any component thereof, and/or other characteristics of wind turbine 10.

In reduced noise operation, the rpm and the power generation are limited by the maximum noise generation permitted to be produced by the wind turbine 10. The noise generation level is determined by local ordinances, laws, codes or the like, with no consideration given to the variable nature of the background noise or the relation of such background noise to the operation of the wind turbine 10.

In hybrid or re-accelerated operation, i.e., operation in which reduced noise operations are required and maintained for certain wind speeds and normal operations are used and maintained for other wind speeds, the pitch of the blades 24 is maintained at zero degrees until wind speeds reach a characteristic wind speed, which is shown as about 9 meters per second (m/s), as shown by curve 402 in FIG. 5. With wind speeds between approximately 9 m/s and approximately 12 m/s, the pitch varies between zero degrees and 11 degrees. With wind speeds between 12 m/s and 13 m/s the pitch is maintained at 11 degrees. With wind speeds between approximately 13 m/s and approximately 25 m/s, the pitch varies between 11 degrees and approximately 28 degrees. This adjustment of the pitch of the blade 24 causes the rotation of the blade tips 25, blades 24 and rotor 18 to follow curve 404 of FIG. 6. As is shown, the rotation per minute (rpm) of the rotor 18 is at zero when the wind speed is zero and increases in a non-constrained manner to a constrained rotational speed, shown as 13 rpm in FIG. 6, when the wind speed is approximately 7 m/s. The rpm is maintained at 13 as the wind speed is increased from 7 m/s to approximately 12 m/s. At approximately 12 m/s, the rpm is increased to 17. The rpm is not permitted to go above design-constrained rotational speed, shown as 17 rpm in FIG. 6, as rpm above the overspeed rotational speed can cause damage and unsafe conditions with respect to the wind turbine 10. The control system 40 uses input from wind sensor 55 and compares the input to the predetermined or programmed nominal wind speeds to determine the maximum rpm for the given wind speed. In the alternative, the control system 40 may calculate or determine the wind speed by using input from other sensors and comparing the input to stored information to calculate the wind speed. The rpm of the rotor 18 is controlled by using any method described herein or any other known method of controlling the rotation of the rotor 18, including the method of changing the pitch of certain blades and maintaining the pitch of other blades. As shown in FIG. 7, the rotation of the rotor 18 which is coupled to the electrical generator 26 causes power to be generated in accordance with curve 406. The range of power generated by each wind turbine 10 varies between zero and 1500 kilowatts (kW) depending on the rotation of the rotor 18, which depends on wind speed. As is shown in FIGS. 6 and 7, the maximum power generation is reached at approximately the same time as the maximum rpm is reached. The power generated is related to the rpm; the maximum power is capped at wind speeds greater than 12 m/s. Accordingly, wind speed, blade pitch, rotor speed, and power output are exemplary values only. Wind speed, blade pitch, rotor speed, and power output may have any other suitable value(s) depending upon, for example, a location of wind turbine 10, design parameters of wind turbine 10 overall and/or any component thereof, and/or other characteristics of wind turbine 10.

In the hybrid operation, the rpm and the power generation are limited by the maximum noise generation permitted by the wind turbine 10 under defined environmental conditions and by the physical limitations of the wind turbine 10 under other environmental conditions. This tiered approach to power generation allows the wind turbine 10 to operate under restricted rpm when the wind is below about 12 m/s, thereby reducing the noise generated by the wind turbine 10. For wind greater than about 12 m/s, the noise generated by the wind turbine 10 is less than the background noise generated by the wind itself. Therefore, the wind turbine 10 is allowed to resume normal operation, generating significantly more power to minimize the loss in energy yield associated with the noise reduction operation. This provides a wind turbine 10 which provides effective noise reduction while minimizing the loss in energy yield.

Figure 8:
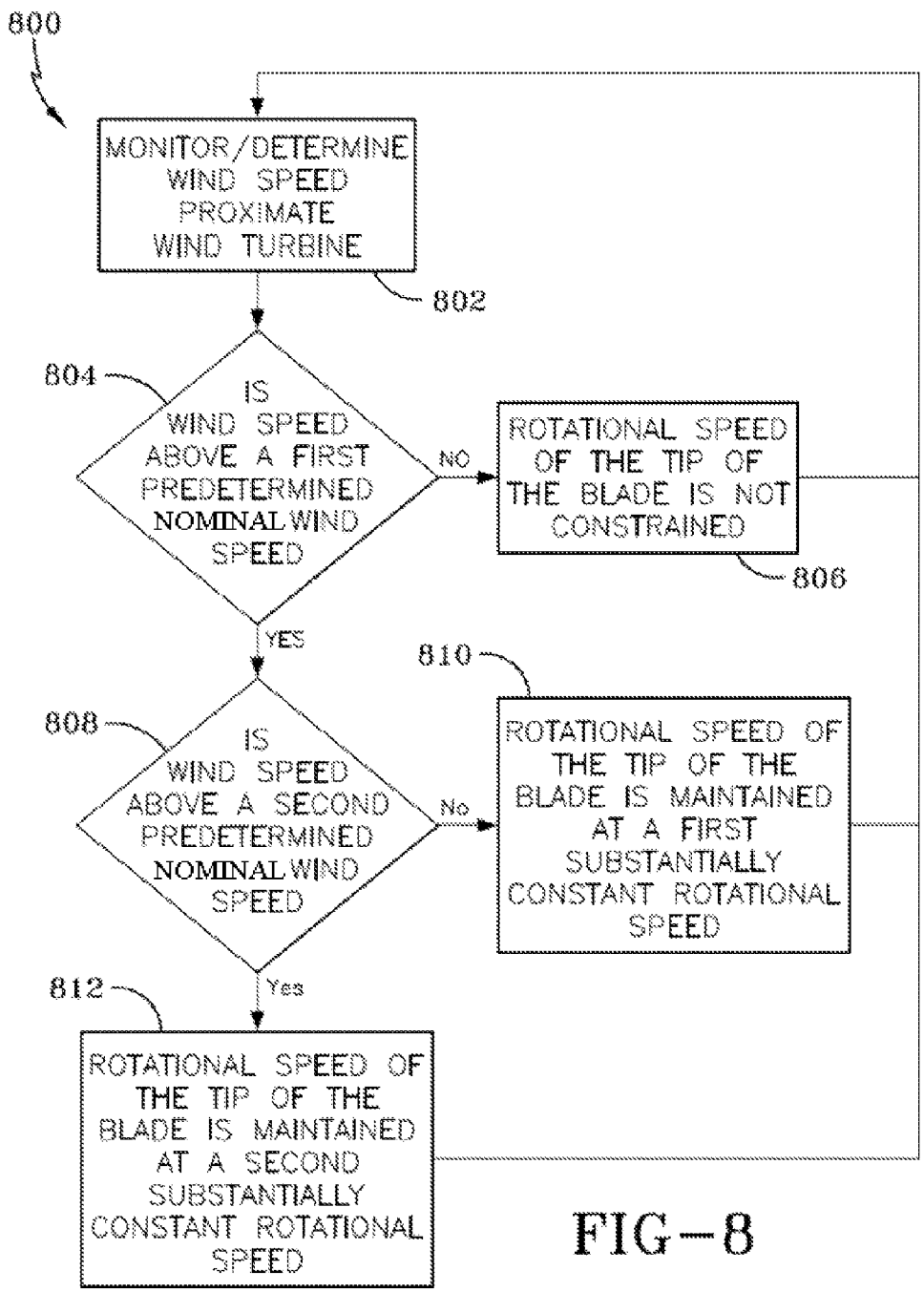
FIG. 8 is a flow chart illustrating the exemplary embodiment of a method of controlling a tip speed of blades of the wind turbine based on the wind speed.

Referring to FIG. 8, the method of 800 for controlling the tip speed of a blade of a wind turbine during the hybrid operation is illustrated by the flowchart. As shown in step 802, the wind speed proximate the wind turbine is monitored or otherwise determined, as described above. The wind speed is compared, step 804, to a first predetermined wind speed. If the wind speed is below the first determined wind speed, the rotational speed of the tip of the blade is not constrained, as shown in 806. If the wind speed is above the first predetermined wind speed, the wind speed is compared, step 808, to a second predetermined wind speed. If the wind speed is above the first predetermined wind speed but below the second predetermined wind speed, the rotational speed of the tip of the blade is maintained at a first substantially constant rotational speed, as shown in 810. If the wind speed is above the second predetermined wind speed, the rotational speed of the tip of the blade is maintained at a second substantially constant rotational speed, as shown in 812. This process is continually repeated to appropriately adjust the rotational speed of the tip of the blade according to the wind speed. As previously described, the noise generated by wind at the second predetermined nominal wind speed is greater than noise generated by the blade at the second constant rotational speed of the tip of the blade.

The herein-described and/or illustrated embodiments have the ability to meet specific maximum noise levels with minimal loss in annual energy yield. The system monitors the wind speed or other parameters and adjusts the maximum tip speed of the wind turbine blade accordingly. For lower wind speeds, the maximum tip speed is limited to minimize the amount of noise generated by the rotation of the blades. However, for higher wind speeds there is no need to limit the maximum tip speed of the blade, as the background noise of the wind will cover even a larger noise generation of the wind turbine. In addition, the movement of the blade pitch towards feather during increased wind speeds limits the wind turbine noise generation. Hence, as the tip speed limit is not required for all wind speeds, the turbine can be re-accelerated and the original rated power achieved without causing the noise level of the wind turbine to increase beyond the background noise generated by the wind.

Although the embodiments described and/or illustrated herein are described and/or illustrated with respect to a wind turbine, and more specifically controlling rotor speed of a wind turbine, practice of the embodiments described and/or illustrated herein is not limited to wind turbines. Rather, the embodiments described and/or illustrated herein are applicable to controlling speed of any rotor having one or more blades.

While the disclosure has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for controlling a tip speed of a blade of a wind turbine, the blade attached to a hub having a shaft, and an electrical generator coupled thereto, said method comprising:
   monitoring with a sensor torque of the electrical generator or power output of the electrical generator to determine wind speed,
   maintaining a first substantially constant rotational speed of the tip of the blade during variable wind speeds above a first predetermined wind speed and below a second predetermined wind speed, the first predetermined wind speed being less than the second predetermined wind speed; and
   maintaining a second substantially constant rotational speed of the tip of the blade during variable wind speeds above the second predetermined wind speed, the second substantially constant rotational speed of the tip of the blade being greater than the first substantially constant rotational speed of the tip of the blade.

2. The method of claim 1, further comprising alternating between changing an angle of pitch of the blade and maintaining the angle of pitch of the blade substantially constant to maintain the first substantially constant rotational speed of the tip of the blade.

3. The method of claim 2, further comprising alternating between changing the angle of pitch of the blade and maintaining the angle of pitch of the blade substantially constant to maintain the second substantially constant rotational speed of the tip of the blade.

4. The method of claim 1, further comprising an angle of pitch of the blade being based on a measured electrical power output of the electrical generator.

5. The method of claim 1, wherein the first substantially constant rotational speed is noise constrained.

6. The method of claim 1, wherein the second substantially constant rotation speed is wind turbine design constrained.

* * * * *